(12) United States Patent
Kanzaki et al.

(10) Patent No.: US 12,730,597 B2
(45) Date of Patent: Sep. 8, 2026

(54) INFORMATION PROCESSING APPARATUS AND NON-TRANSITORY COMPUTER READABLE MEDIUM FOR SCHEDULING AND PROCESSING FINISHED PRODUCTS

(71) Applicant: FUJIFILM Business Innovation Corp., Tokyo (JP)

(72) Inventors: Ami Kanzaki, Kanagawa (JP); Naoto Yamasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/303,261

(22) Filed: Apr. 19, 2023

(65) Prior Publication Data

US 2024/0152303 A1 May 9, 2024

(30) Foreign Application Priority Data

Nov. 8, 2022 (JP) ................................ 2022-178661

(51) Int. Cl.
*G06F 3/12* (2006.01)

(52) U.S. Cl.
CPC .......... *G06F 3/1275* (2013.01); *G06F 3/1205* (2013.01); *G06F 3/1208* (2013.01)

(58) Field of Classification Search
None
See application file for complete search history.

(56) References Cited

U.S. PATENT DOCUMENTS

2003/0050818 A1 3/2003 Maie et al.
2017/0003923 A1 1/2017 Hane
2022/0214842 A1* 7/2022 Anno .................... G06F 3/1208
2022/0391155 A1* 12/2022 Wissenbach .......... G06F 3/1257
2023/0102319 A1* 3/2023 Aher ..................... G06F 3/1275
358/1.15

FOREIGN PATENT DOCUMENTS

JP 2003-091661 A 3/2003
JP 2017-016315 A 1/2017

* cited by examiner

*Primary Examiner* — Miya J Cato
(74) *Attorney, Agent, or Firm* — Oliff PLC

(57) ABSTRACT

An information processing apparatus includes a processor configured to: receive, from a first user, product information that is input and related to a finished product produced in accordance with a workflow and excludes workflow information that is related to the workflow; present, to a second user, information indicated by the received product information; and receive from the second user the workflow information responsive to production of the finished product.

11 Claims, 10 Drawing Sheets

| ORDER ID | DATE AND TIME OF ORDER | PRODUCT INFORMATION | | WORKFLOW INFORMATION | | |
|---|---|---|---|---|---|---|
| | | SCHEDULED DATE AND TIME OF SHIPMENT COMPLETION | ... | WORKFLOW NAME | WORKFLOW ID | ... |
| 20220909-00001 | 2022/09/09 13:38:13 | 2022/10/09 17:00:00 | ... | SADDLE STITCH BOOK BINDING | Binding-pattern2 | ... |
| 20220909-00002 | 2022/09/09 14:12:10 | 2022/10/10 14:30:00 | ... | SIDE STITCH BOOK BINDING | Binding-pattern1 | ... |
| 20220909-00003 | 2022/09/09 15:28:45 | 2022/10/11 16:00:00 | ... | — | — | ... |
| ⋮ | ⋮ | ⋮ | ⋮ | ⋮ | ⋮ | ⋮ |

| WORKFLOW NAME | DATE AND TIME OF CREATING | CREATOR | DATE AND TIME OF LAST UPDATE | LAST UPDATER | WORKFLOW ID | WORKFLOW |
|---|---|---|---|---|---|---|
| SIDE STITCH BOOK BINDING | 2022/08/10 12:34:56 | A | 2022/08/12 10:15:46 | C | Binding-pattern1 | (WORKFLOW 1) |
| SADDLE STITCH BOOK BINDING | 2022/08/15 16:42:36 | B | 2022/08/18 12:00:15 | D | Binding-pattern2 | (WORKFLOW 2) |
| ⋮ | ⋮ | ⋮ | ⋮ | ⋮ | ⋮ | ⋮ |

Figure 8:
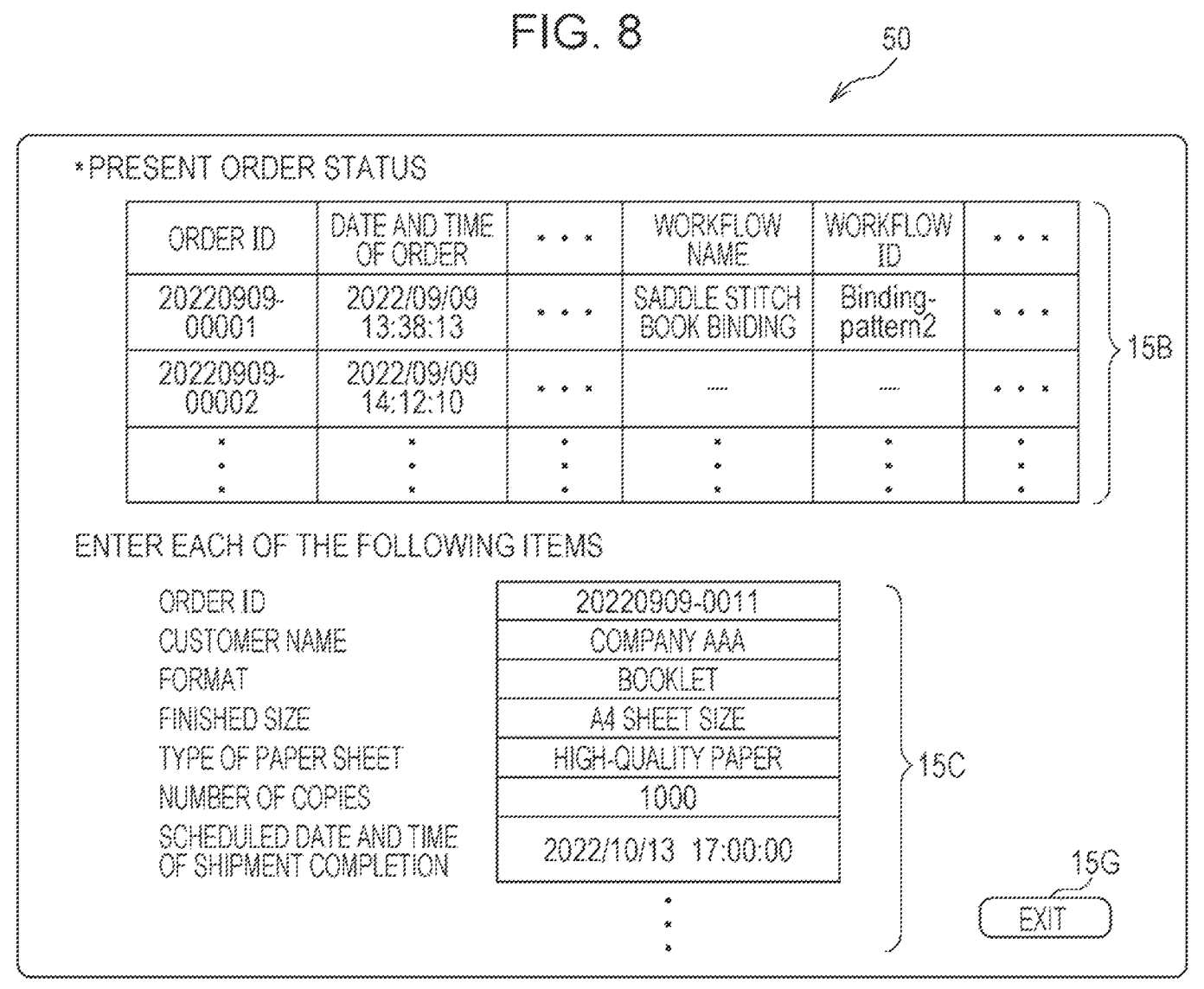

*PRESENT ORDER STATUS

| ORDER ID | DATE AND TIME OF ORDER | ... | WORKFLOW NAME | WORKFLOW ID | ... |
|---|---|---|---|---|---|
| 20220909-00001 | 2022/09/09 13:38:13 | ... | SADDLE STITCH BOOK BINDING | Binding-pattern2 | ... |
| 20220909-00002 | 2022/09/09 14:12:10 | ... | — | — | ... |
| ⋮ | ⋮ | ⋮ | ⋮ | ⋮ | ⋮ |

15B

ENTER EACH OF THE FOLLOWING ITEMS

| | |
|---|---|
| ORDER ID | 20220909-0011 |
| CUSTOMER NAME | COMPANY AAA |
| FORMAT | BOOKLET |
| FINISHED SIZE | A4 SHEET SIZE |
| TYPE OF PAPER SHEET | HIGH-QUALITY PAPER |
| NUMBER OF COPIES | 1000 |
| SCHEDULED DATE AND TIME OF SHIPMENT COMPLETION | 2022/10/13 17:00:00 |
| | ⋮ |

15C

EXIT

15G

50
*PRESENT ORDER STATUS
15B
ORDER ID
DATE AND TIME OF ORDER
WORKFLOW NAME
WORKFLOW ID
20220909-00001
2022/09/09 13:38:13
SADDLE STITCH BOOK BINDING
Binding-pattern2
20220909-00002
2022/09/09 14:12:10
—
—
EDIT DISABLED REGION
15D1
SELECT TEMPLATE
15D2
SET WORKFLOW

Figure 10:
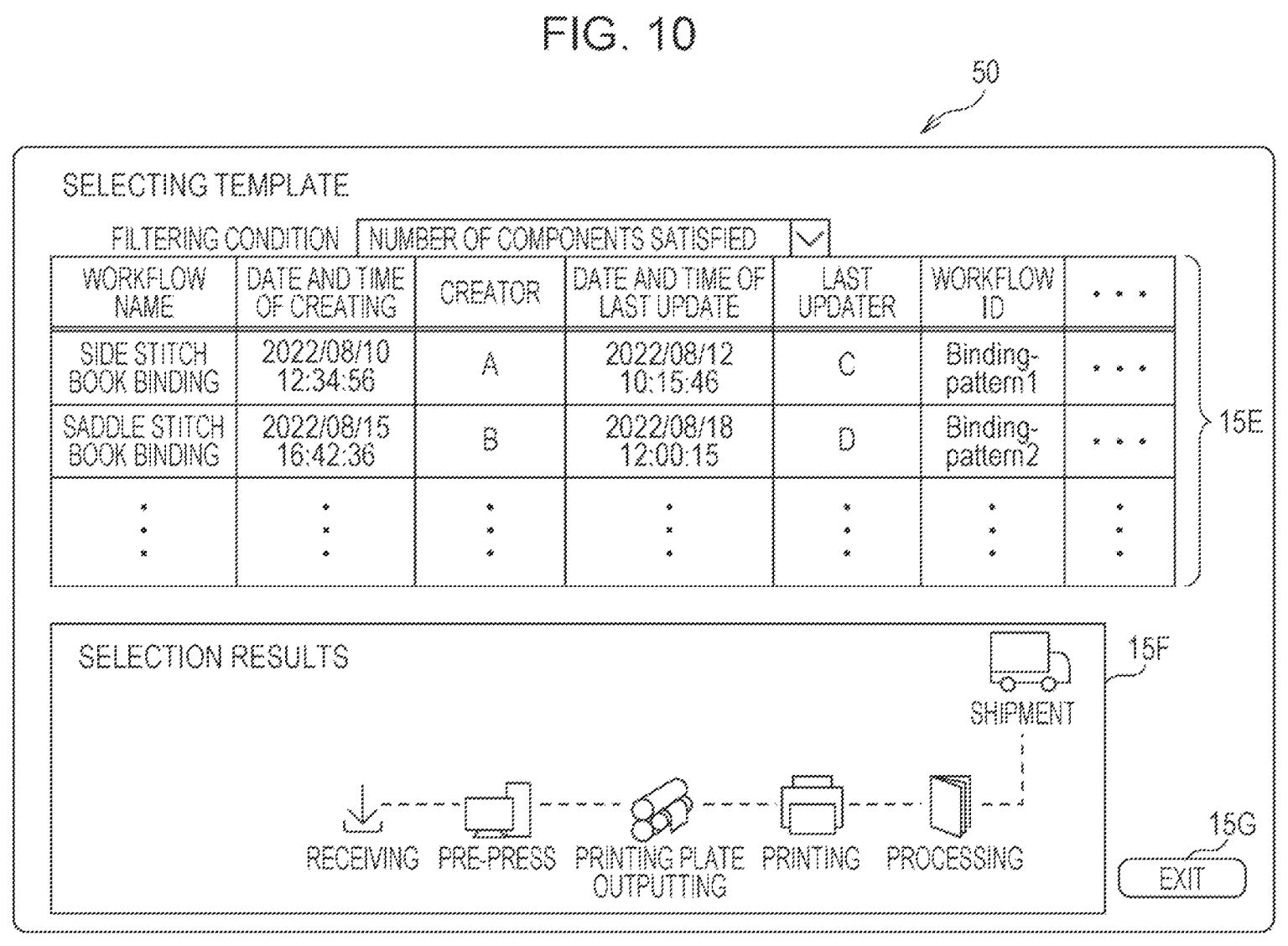

SELECTING TEMPLATE

FILTERING CONDITION NUMBER OF COMPONENTS SATISFIED

| WORKFLOW NAME | DATE AND TIME OF CREATING | CREATOR | DATE AND TIME OF LAST UPDATE | LAST UPDATER | WORKFLOW ID | ... |
|---|---|---|---|---|---|---|
| SIDE STITCH BOOK BINDING | 2022/08/10 12:34:56 | A | 2022/08/12 10:15:46 | C | Binding-pattern1 | ... |
| SADDLE STITCH BOOK BINDING | 2022/08/15 16:42:36 | B | 2022/08/18 12:00:15 | D | Binding-pattern2 | ... |
| ⋮ | ⋮ | ⋮ | ⋮ | ⋮ | ⋮ | ⋮ |

15E

SELECTION RESULTS

15F

RECEIVING PRE-PRESS PRINTING PLATE OUTPUTTING PRINTING PROCESSING SHIPMENT

15G

EXIT

INFORMATION PROCESSING APPARATUS AND NON-TRANSITORY COMPUTER READABLE MEDIUM FOR SCHEDULING AND PROCESSING FINISHED PRODUCTS

CROSS-REFERENCE TO RELATED APPLICATIONS

This application is based on and claims priority under 35 USC 119 from Japanese Patent Application No. 2022-178661 filed Nov. 8, 2022.

BACKGROUND

(i) Technical Field

The present disclosure relates to an information processing apparatus and a non-transitory computer readable medium.

(ii) Related Art

Techniques capable of consistently supporting a series of operations from receiving an order, producing a finished product responsive to the order, and shipping the finished product are available.

Japanese Unexamined Patent Application Publication No. 2003-91661 discloses a production management system that shortens lead time and levels production in build-to-order production.

The production management system performs production and management on products in accordance with order information from a sales department. The production management system includes a quotation support subsystem in which the sales department enters the order information and a production reservation subsystem that reserves production time in a production department in response to the order information entered into the production reservation subsystem.

Japanese Unexamined Patent Application Publication No. 2017-16315 discloses a workflow production support system that is intended to shorten operation time by simplifying work for job production and job update.

The workflow production support system assists in producing a workflow to perform a printing operation. The workflow production support system includes a job information acquisition unit, a narrow-down processing unit, a selection screen data production unit, and a job definition file production unit. The job information acquisition unit acquires job information that includes information related to multiple parameters identifying contents of a job. The narrow-down processing unit performs a narrow-down process to narrow down to a template serving as a selection target, using information on at least a subset of parameters out of information on multiple parameters acquired by the job information acquisition unit from multiple pre-registered templates. The selection screen data production unit produces selection screen data. The selection screen data is used to display, as selected candidates, information on the templates narrowed down by the narrow-down processing unit and to display a selection screen that receives a selection operation for a user to select one template from the selected candidates. The job definition file production unit produces a job definition file in accordance with information on the single template selected in response to the selection operation and information on the multiple parameters.

When a product is produced in accordance with a workflow, a user receiving the finished product and a user producing the product may enter information in accordance with the roles of the users. In such a case, there arises a problem of unnecessary operation that information related on the finished product obtained by the user receiving the finished product is conveyed to the user producing the finished product before the information is entered.

SUMMARY

Aspects of non-limiting embodiments of the present disclosure relate to providing an information processing apparatus and a non-transitory computer readable medium, operating in a manner that is free from an operation that enters information on a finished product, obtained by a predetermined user, by transferring the information to another user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive, from a first user, product information that is input and related to a finished product produced in accordance with a workflow and excludes workflow information that is related to the workflow; present, to a second user, information indicated by the received product information; and receive from the second user the workflow information responsive to production of the finished product.

BRIEF DESCRIPTION OF THE DRAWINGS

Exemplary embodiment of the present disclosure will be described in detail based on the following FIGURES, wherein:

FIG. 4 schematically illustrates a structure example of an order information database of the exemplary embodiment;

FIG. 5 schematically illustrates a structure example of a template information database of the exemplary embodiment;

FIG. 8 is a front view of an example of an order production screen of the exemplary embodiment;

FIG. 10 is a front view of an example of a template selection screen of the exemplary embodiment.

DETAILED DESCRIPTION

Exemplary embodiment of the disclosure is described in detail with reference to the drawings.

Figure 1:
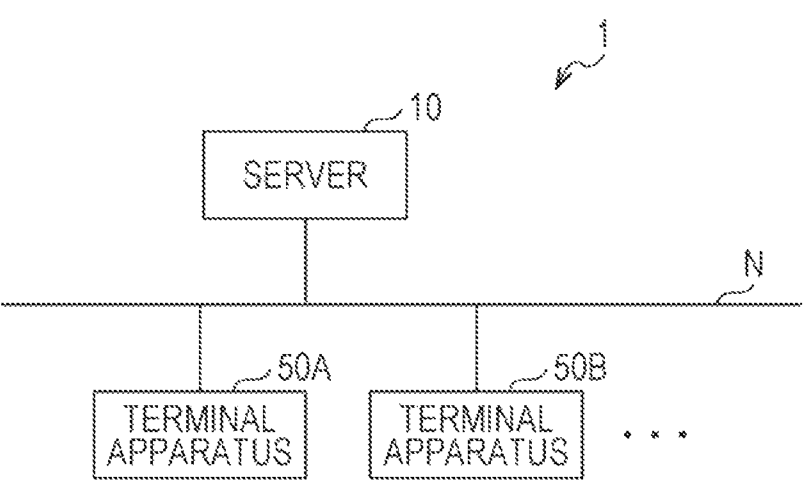
FIG. 1 is a block diagram illustrating a configuration example of an information processing system of an exemplary embodiment.

The configuration of an information processing system 1 of the exemplary embodiment is described with reference to FIG. 1. FIG. 1 is a block diagram illustrating the configuration example of the information processing system 1 of the exemplary embodiment.

Referring to FIG. 1, the information processing system 1 includes a server 10 serving as an information processing apparatus of the exemplary embodiment of the disclosure, and multiple terminal apparatuses 50A and 50B. Each of the terminal apparatuses 50A and 50B, if not differentiated from each other, is collectively referred to as a terminal apparatus 50.

Each of the server 10 and terminal apparatus 50 may be a stationary information processing apparatus, such as a personal computer or a server computer. Alternatively, each of the server 10 and terminal apparatus 50 may be a mobile information processing apparatus, such as a tablet terminal or a mobile information terminal.

The server 10 and the terminal apparatus 50 are communicably connected to each other via a network N. According to the exemplary embodiment, the network N includes but is not limited to a public communication network, such as the Internet or a telephone network. The network N may also include an in-house communication network, such as a local-area network (LAN) and wide-area network (WAN) or a combination of the public communication network and the in-house communication network. According to the exemplary embodiment, the network N includes a wired network, a wireless network, or a communication thereof.

Figure 2:
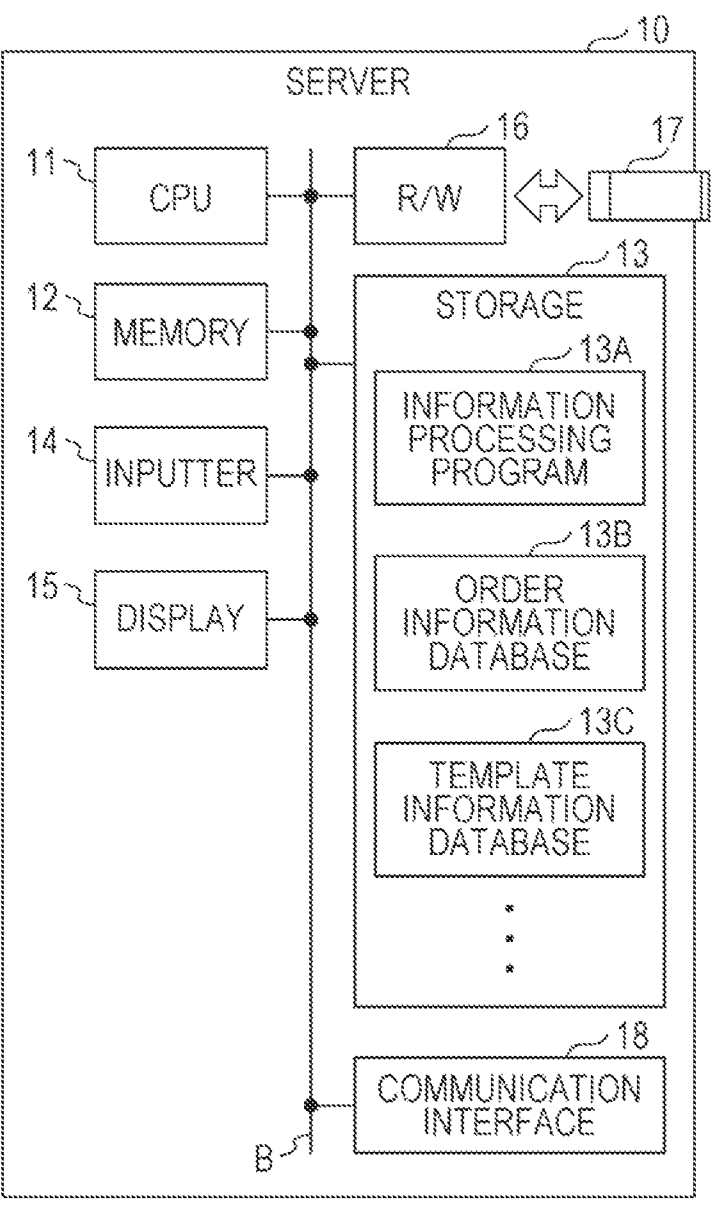
FIG. 2 is a block diagram illustrating a hardware configuration example of a server of the exemplary embodiment.
Figure 3:
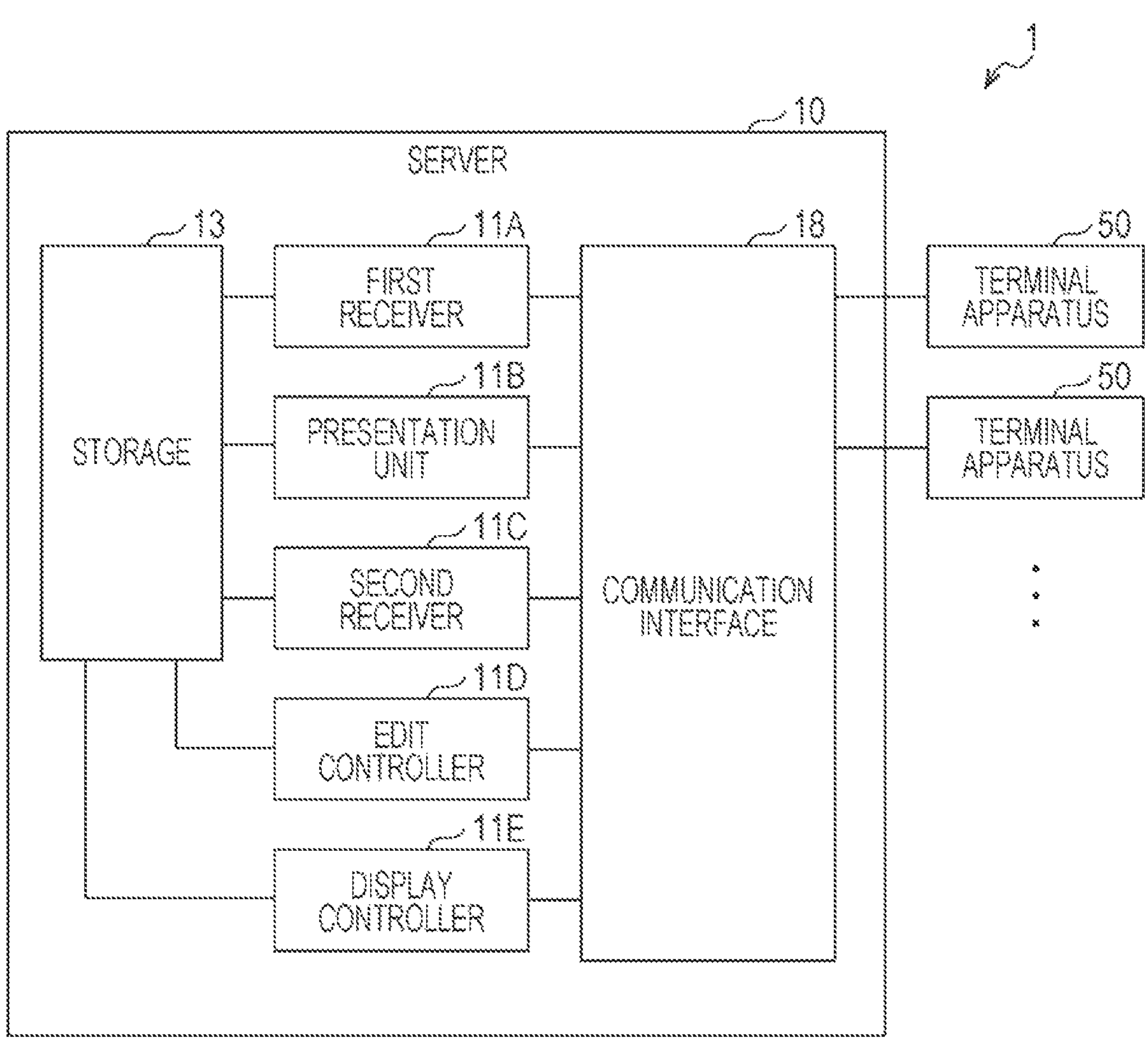
FIG. 3 is a block diagram illustrating a functional configuration example of the server of the exemplary embodiment.

The configuration of the server 10 of the exemplary embodiment is described with reference to FIGS. 2 and 3. FIG. 2 is a block diagram illustrating a hardware configuration example of the server 10 of the exemplary embodiment, and FIG. 3 is a block diagram illustrating a functional configuration example of the server 10 of the exemplary embodiment;

Referring to FIG. 2, the server 10 of the exemplary embodiment includes a central processing unit (CPU) 11 as a processor, a memory 12 serving as a temporary storage area, non-volatile storage 13, input unit 14, such as a keyboard and mouse, display 15, such as a liquid-crystal display, medium reader/writer (R/W) 16, and communication interface 18. The CPU 11, memory 12, storage 13, inputter 14, display 15, reader/writer 16, and communication interface 18 are connected to each other via a bus B. The medium reader/writer 16 reads information from and/or writes information to a recording medium 17.

The storage 13 of the exemplary embodiment is implemented by a hard-disk drive (HDD), solid-state drive (SSD), or flash memory. The storage 13 serving as a recording medium stores an information processing program 13A.

The information processing program 13A is stored (installed) on the storage 13 when the recording medium 17 having the information processing program 13A written thereon is connected to the medium reader/writer 16 and the medium reader/writer 16 reads the information processing program 13A from the medium reader/writer 16. The CPU 11 reads the information processing program 13A from the storage 13 as appropriate, loads the information processing program 13A onto the memory 12, and sequentially executes a process of the information processing program 13A.

The storage 13 also stores an order information database 13B and template information database 13C. The order information database 13B and template information database 13C are described below in greater detail.

Referring to FIG. 3, the functional configuration of the server 10 of the exemplary embodiment is described. As illustrated in FIG. 3, the server 10 of the exemplary embodiment includes a first receiver 11A, presentation unit 11B, second receiver 11C, edit controller 11D, and display controller 11E. The CPU 11 in the server 10 executes the information processing program 13A, thereby functioning as the first receiver 11A, presentation unit 11B, second receiver 11C, edit controller 11D, and display controller 11E.

The first receiver 11A of the exemplary embodiment receives product information from a first user via the terminal apparatus 50. The product information is related to a finished product produced in accordance with a workflow and excludes workflow information related to the workflow. The term "workflow" signifies a series or a set of operations that are operatively connected in response to an action of a user. According to the exemplary embodiment, the finished product is printed matter. The finished product is not limited to printed matter and may be any object as long as the object is produced in accordance with a workflow. For example, the finished product may be a vehicle, a building, or the like.

The presentation unit 11B of the exemplary embodiment presents, to a second user, information indicated by the product information received by the first receiver 11A. According to the exemplary embodiment, the presentation by the presentation unit 11B is performed by the display of the terminal apparatus 50. The exemplary embodiment is not limited to this method. For example, the presentation by the presentation unit 11B may be performed by printing on an image forming apparatus or by sound created by a sound reproduction apparatus.

The second receiver 11C of the exemplary embodiment receives the workflow information responsive to the production of the finished product from the second user via the terminal apparatus 50.

According to the exemplary embodiment, the product information includes information indicating a scheduled date and time of a corresponding finished product and further includes at least one of a format, a finished size, a type of paper sheet, and the number of copies of printed matter (in the exemplary embodiment, the product information includes all of the format, the finished size, the type of paper sheet, and the number of copies of printed matter). According to the exemplary embodiment, the workflow information includes information (a workflow name and a workflow identification (ID) in the exemplary embodiment) indicating a corresponding workflow and further includes at least one piece of information related to pre-press of the printed matter, information related to printing plate outputting, information related to printing, and information related to processing (in the exemplary embodiment, the workflow information includes all of the information related to pre-press of the printed matter, the information related to printing plate outputting, the information related to printing, and the information related to processing).

According to the exemplary embodiment, the first receiver 11A and second receiver 11C receive the product information and the workflow information respectively from different terminal apparatuses 50. The exemplary embodiment is not limited to this method. The product information and workflow information may be received from the same terminal apparatus 50.

According to the exemplary embodiment, the first user has a sales operation role to sell the finished product and the second user has a work operation role to produce the product. The exemplary embodiment is not limited to this method. The first user and second user may be any of the persons, having their own roles, such as office worker, person in charge, contact person, production person, etc.

The edit controller 11D of the exemplary embodiment disables the user having the work role to edit the product information. According to the exemplary embodiment, a process to deny an access right to the product information is performed on the user having the work operation role such that the user having the work operation role is disabled to edit the product information. The exemplary embodiment is not limited to this method. For example, the user having the work operation role may be disabled to edit the product information by causing the terminal apparatus 50 available to the user having the work operation role not to display the product information.

The first receiver 11A and second receiver 11C of the exemplary embodiment receive from users an indication of selection between a first mode and a second mode. In the first mode, the product information is received from the first user the product information, information indicated by the received product information is presented to the second user information, and the workflow information is received from the second user. In the second mode, the product information and the workflow information are received from the same user.

Regardless of results of the selection, the display controller 11E of the exemplary embodiment displays, on the terminal apparatus 50, order information indicating a target for which the product information is received. The display controller 11E of the exemplary embodiment displays, on an order information list screen, the order information including the product information, in the first mode, after the product information is received and before the workflow information is received from the second user. The display controller 11E of the exemplary embodiment displays the order information on the order information list screen in the second mode after the product information and workflow information are received.

Referring to FIG. 4, the order information database 13B of the exemplary embodiment is described. FIG. 4 schematically illustrates a structure example of the order information database 13B.

The order information is registered in the order information database 13B. Referring to FIG. 4, the order information database 13B stores an order identification (ID), date and time of order, product information, and workflow information in an associated form.

The order ID is attached to each product as an order target to individually identify the order target, and the date and time of order indicates a date and time of order on which the corresponding order is received. The product information indicates the finished product serving as the corresponding order target, and the workflow information indicates the corresponding workflow for the corresponding order target.

The template information database 13C of the exemplary embodiment is described with reference to FIG. 5. FIG. 5 schematically illustrates a structure example of the template information database 13C.

Information on a template of a workflow produced by the user having the work operation role is registered on the template information database 13C. Referring to FIG. 5, the template information database 13C stores a workflow name, date and time of creating, creator, date and time of last update, last updater, workflow ID, and workflow in an associated form.

The workflow name and workflow ID are respectively identical to the workflow name and workflow ID included the workflow information of the order information database 13B. The date and time of creating indicate the date and time when the corresponding workflow is first produced, and the creator indicates a user who first produces the corresponding workflow. The date and time of last update indicate the date and time of the last update of the corresponding workflow, and the last updater indicates a user who has updated last the corresponding workflow last.

The workflow directly indicates the workflow itself and includes component name information indicating the name of a component forming the workflow, and icon information indicating an icon of the component.

Figure 6:
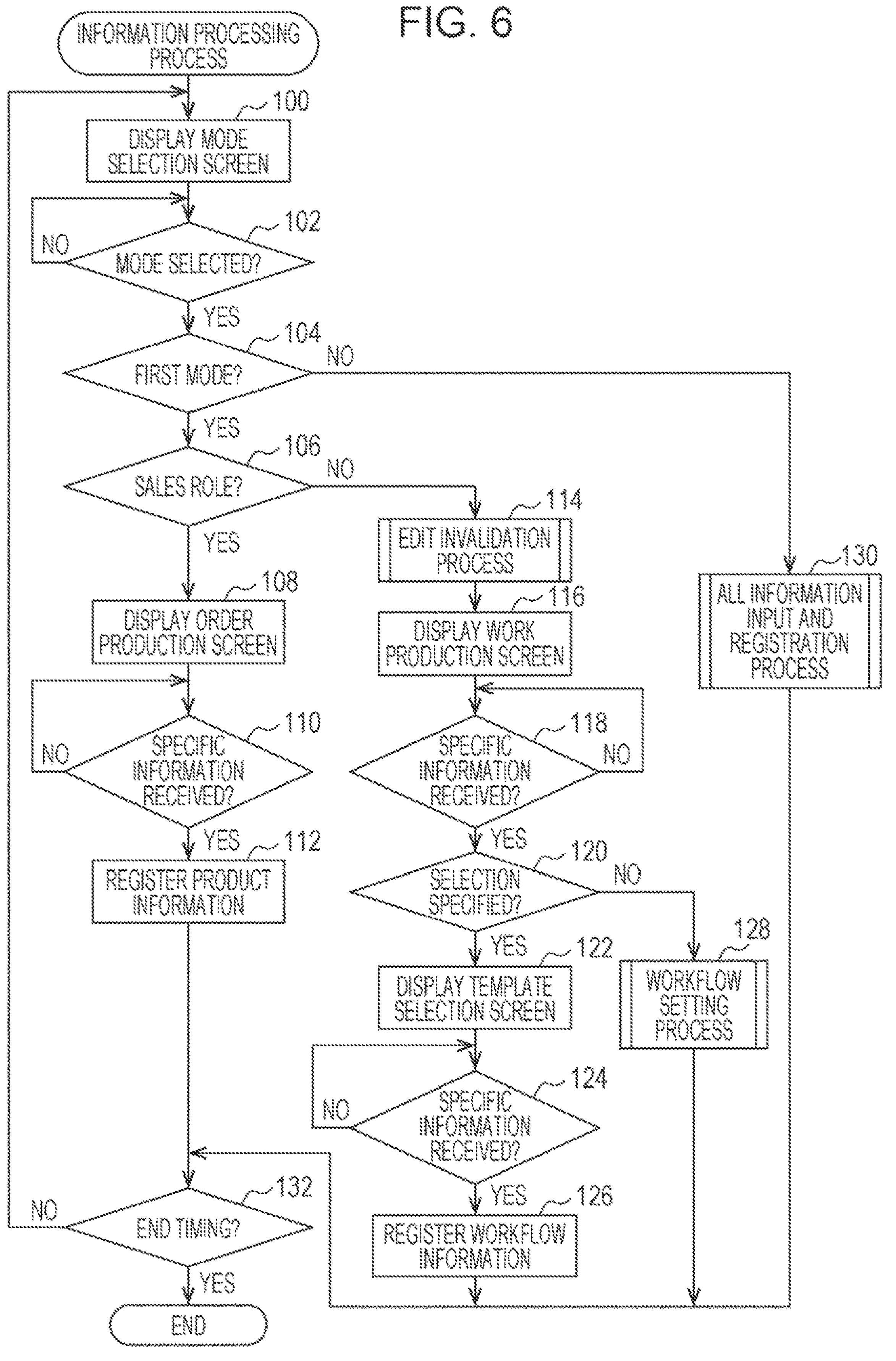
FIG. 6 is a flowchart illustrating an example of an information processing process of the exemplary embodiment.

Referring to FIG. 6, the process of the information processing system 1 of the exemplary embodiment is described. In the operation of the information processing system 1, the server 10 having a central role performs an information processing process in the information processing system 1. FIG. 6 is a flowchart illustrating an example of the information processing process of the exemplary embodiment.

In the information processing system 1 of the exemplary embodiment, an instruction to start the information processing process is entered to the terminal apparatus 50 when the user having a sales operation role enters the product information, when the user having a work operation role enters the workflow information, or when any other user alone enters each pieces of the information. The information processing process is performed when the CPU 11 in the server 10 executes the information processing program 13A in response to an instruction from the terminal apparatus 50 that responds to the user instruction. For convenience of explanation, the constructed order information database 13B and template information database 13C are used.

Figure 7:
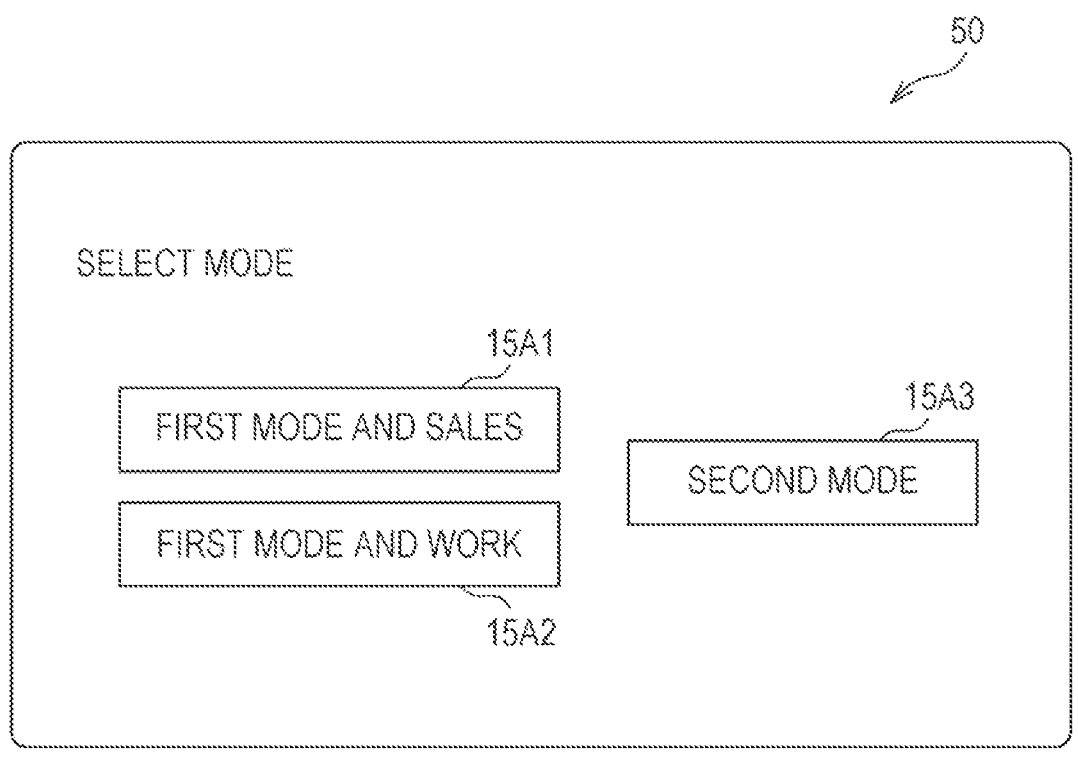
FIG. 7 is a front view of an example of a mode selection screen of the exemplary embodiment.

In step S100 in FIG. 6, the CPU 11 controls the terminal apparatus 50 (hereinafter referred to as a target terminal apparatus) serving an access source such that a display of the terminal apparatus 50 displays a mode selection screen in a predetermined structure. FIG. 7 illustrates an example of the mode selection screen of the exemplary embodiment.

Referring to FIG. 7, a message prompting the user to specify a mode to be used is displayed on the mode selection screen of the exemplary embodiment. The mode selection screen displays a first mode and sales button 15A1 that is specified if the first mode is selected and the user is the user having the sales operation role. The mode selection screen also displays a first mode and work button 15A2 that is specified if the first mode is selected and the user is the user having the work operation role. The mode selection screen further displays a second mode button 15A3 that is specified to select the second mode.

When the target terminal apparatus displays the mode selection screen, the user select one of the first mode and sales button 15A1, first mode and work button 15A2, and second mode button 15A3. In step 102, the CPU 11 waits on standby until one of the buttons is selected. Specifically, the target terminal apparatus waits on standby until the user selects one of the first mode and sales button 15A1, first mode and work button 15A2, and second mode button 15A3. The target terminal apparatus then transmits, to the server 10, first identification information that identifies the button selected by the user. In step 102, the CPU 11 in the server 10 thus waits on standby until the first identification information is received from the target terminal apparatus.

In step 104, the CPU 11 uses the received first identification information to determine whether the button selected by the user is the first mode and sales button 15A1 or the first mode and work button 15A2. The CPU 11 thus determines whether the first mode is selected by the user. If the yes path is followed in step 104, the CPU 11 proceeds to step 106.

In step 106, the CPU 11 determines whether the first mode and sales button 15A1 is selected by the user and thus determines whether the user is the user having the sales operation role. If the yes path is followed in step 106, the CPU 11 proceeds to step 108.

In step 108, the CPU 11 reads all data (hereinafter referred to as order information) registered heretofore on the order information database 13B and controls the target terminal apparatus using the order information such that the display displays an order production screen in a predetermined structure. In step 110, the CPU 11 waits on standby until specific information is received from the target terminal apparatus. FIG. 8 illustrates an example of the order production screen of the exemplary embodiment.

Referring to FIG. 8, the order production screen of the exemplary embodiment displays order status information 15B that is a present order status indicated by the read order information. As illustrated in FIG. 8, only the product information is presently registered and an order target with the workflow information unregistered therefor is denoted by unregistered information (symbol "-" in the exemplary embodiment) indicating no workflow information registered. By referencing the order production screen, the user may learn all order targets received at this point of time regardless of whether the workflow information is registered or not.

The order production screen of the exemplary embodiment displays, together with the message prompting the user to enter an input at each entry item, an input region 15C where a variety of the product information is to be entered.

When the order production screen is displayed on the target terminal apparatus, the user references the order status information 15B. After verifying the order status at this moment, the user selects an exit button 15G after entering at the corresponding input region 15C the product information related to an order target that is to be newly registered. In response, the target terminal apparatus transmits the product information entered by the user to the server 10. When the product information is received, the yes path is followed in step 110 and the CPU 11 proceeds to step 112. The order production screen in FIG. 8 corresponds to an order information list screen of the disclosure.

Referring to FIG. 8, the user enters an order ID. The exemplary embodiment is not limited to this method. For example, the target terminal apparatus or the server 10 may automatically generate an order ID that has not been used heretofore and may display the order ID.

In step 112, the CPU 11 stores (registers) the received product information on the order information database 13B and then proceeds to step 132. When the product information is registered, the CPU 11 registers on the order information database 13B information indicating the date and time at this moment as the date and time of order.

If the no path is followed in step 106, the CPU 11 determines that the user is the user having the work operation role and then proceeds to step 114. In step 114, the CPU 11 performs an edit invalidation process such that the user is disabled to edit the product information.

Figure 9:
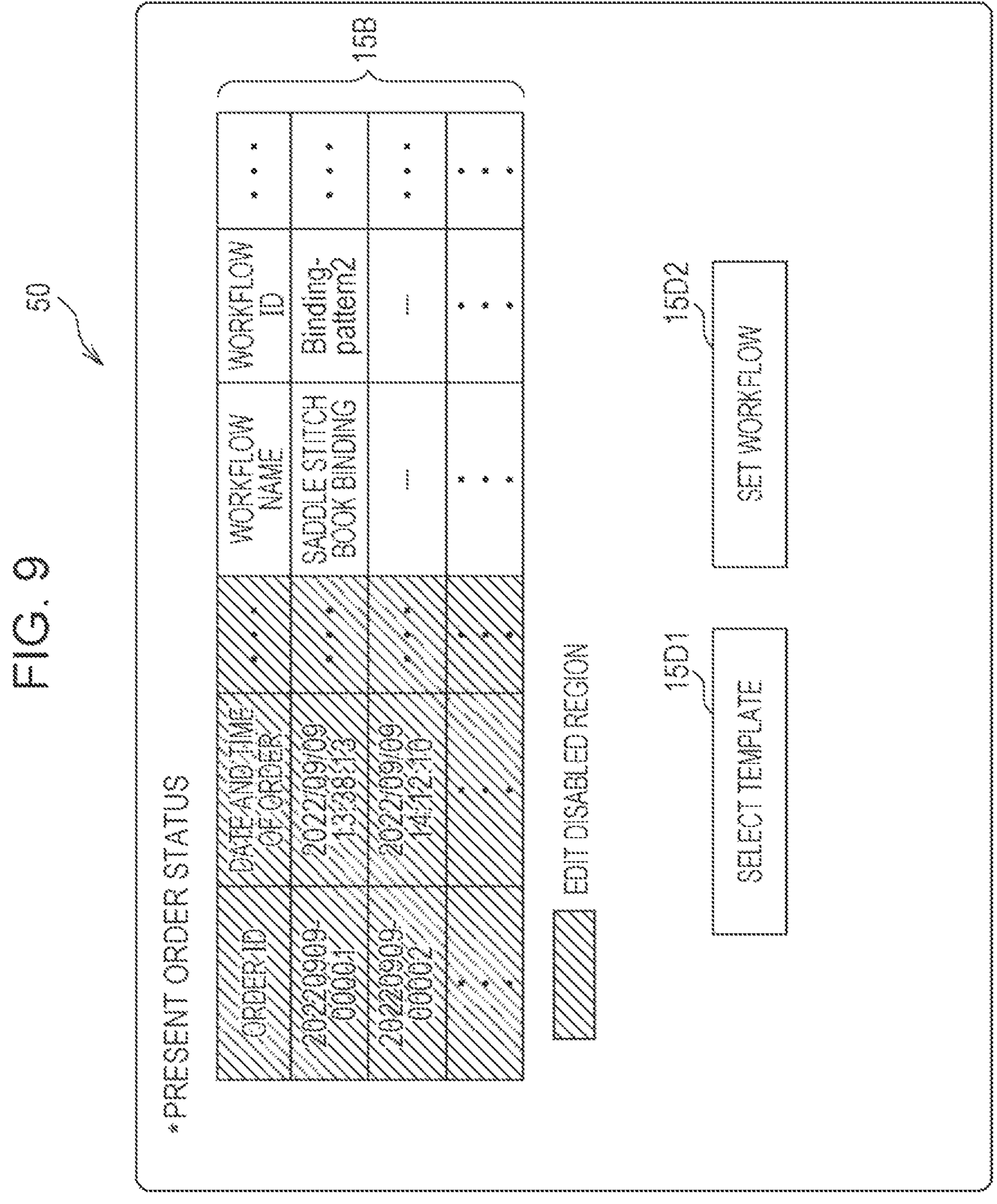
FIG. 9 is a front view of an example a work production screen of the exemplary embodiment.

In step 116, the CPU 11 controls the target terminal apparatus such that all information (the order information) registered heretofore is read from the order information database 13B and a work production screen in a predetermined structure is displayed on the display using the order information. FIG. 9 illustrates an example of the work production screen of the exemplary embodiment.

Referring to FIG. 9, in a similar way as the order production screen, the work production screen of the exemplary embodiment displays the order status information 15B that is the present order status indicated by the read order information. It is noted however that the work production screen displays the product information, invalided in the operation in step 114, in the form indicative of invalidation (in a hatched area in FIG. 9). By referencing the order status information 15B, the user may recognize all order targets that have been currently received and may thus easily recognize that the product information is not editable. The work production screen in FIG. 9 also corresponds to the order information list screen of the exemplary embodiment of the disclosure.

The order production screen of the exemplary embodiment displays a template selection button 15D1. The template selection button 15D1 is selected when one of the templates of workflows registered on the template information database 13C is selected for use. The order production screen also displays a workflow setting button 15D2. The workflow setting button 15D2 is selected when the user directly enters a workflow. The user herein selects an order target for which the workflow information is entered, by selecting in the order status information 15B a display region of the product information where the workflow is registered. The user thus selects one of the template selection button 15D1 and workflow setting button 15D2.

In step 118, the CPU 11 waits on standby until one of the two buttons is selected. Specifically, the target terminal apparatus waits on standby until the user specifies either the template selection button 15D1 or the workflow setting button 15D2. The target terminal apparatus then transmits to the server 10 second identification information identifying the button selected by the user. The CPU 11 in the server 10 waits on standby in step 118 until the second identification information is received from the target terminal apparatus.

In step 120, the CPU 11 determines in accordance with the received second identification information whether the button specified by the user is the template selection button 15D1. The CPU 11 thus determines whether one of the existing templates is selected for use by the user. If the yes path is followed in step 120, the CPU 11 proceeds to step 122.

In step 122, the CPU 11 reads all information (hereinafter referred to as "template information") registered heretofore on the template information database 13C. Using the read template information, the CPU 11 controls the target terminal apparatus such that a template selection screen is displayed on the display. In step 124, the CPU 11 waits on standby until specific information is received from the target terminal apparatus. FIG. 10 illustrates an example of the template selection screen of the exemplary embodiment.

Referring to FIG. 10, the template selection screen of the embodiment displays template set information 15E. The template set information 15E lists information related to workflows indicated by the read template information. According to the exemplary embodiment, the template set information 15E displays only a template that is filtered through according to a predetermined filtering condition as illustrated in FIG. 10. The enclosure is not limited to this method. For example, all templates indicated by the read template information may be displayed on the template set information 15E. As illustrated in FIG. 10, according to the exemplary embodiment, the filtering condition is that the number of components is matched. The disclosure is not limited to this condition. For example, the filtering condition may be a condition that the same format is used, or a condition that the finished products are produced during the same production period, or a combination thereof.

When the template selection screen is displayed by the target terminal apparatus, the user selects a display region of a template in the display template set information 15E. In response, the target terminal apparatus transmits to the server 10 third identification information identifying the template selected by the user. Upon receiving the third identification information, the CPU 11 in the server 10 extracts from the read template information the workflow responsive to the selected template, produces schematic workflow information indicating schematically the extracted workflow, and then transmits the schematic workflow information to the target terminal apparatus. The target terminal apparatus displays on the template selection screen a schematic diagram 15F of the workflow indicated by the schematic workflow information.

Referring to FIG. 10, the schematic diagram 15F of the exemplary embodiment schematically illustrates, in the order of processing, a workflow indicated by the template specified by the user. The workflow is schematically displayed using components and icons. By referencing the schematic diagram 15F, the user may easily and intuitively recognize the workflow selected by the user. In the schematic diagram 15F, "receiving" and "shipment" are displayed as components responsive to the inputting of the product information by the user having the sales operation role. In the schematic diagram 15F, "pre-press," "printing plate outputting," "printing," "and "processing" are displayed as components responsive to the inputting of the workflow information by the user having the work operation role. The components responsive to the product information and workflow information are not limited to these components.

The user may not use the workflow in the displayed schematic diagram 15F but may select the display region of another template in the displayed template set information 15E. In such a case, the schematic diagram 15F responsive to the selected template is displayed (updated) in the flow of process in the template selection screen.

To use the workflow in the displayed schematic diagram 15F, the user selects an exit button 15G. In such a case, the target terminal apparatus transmits to the server 10 final selection information indicating the workflow displayed in the schematic diagram 15F. When the server 10 receives the final selection information, the yes path is followed in step 124, and the CPU 11 proceeds to step 126.

In step 126, the CPU 11 stores (registers) on the order information database 13B the workflow information responsive to the workflow indicated by the final selection information received from the target terminal apparatus. In this case, the workflow information is stored in association with the corresponding product information. The CPU 11 then proceeds to step 132.

If the no path is followed in step 120, the CPU 11 determines that the workflow setting button 15D2 is selected and then proceeds to step 128. In step 128, the CPU 11 allows the user to manually produce a workflow, performs a workflow setting process to register the workflow information on the order information database 13B, and then proceeds to step 132. The workflow setting process is one of related-art techniques and the discussion thereof is omitted herein.

The workflow produced by the user in the workflow setting process is successively registered on the template information database 13C. In this way, the workflow is available to users of the information processing system 1.

If the no path is followed in step 104, the CPU 11 determines that the second mode is specified by the user and then proceeds to step 130. In step 130, the CPU 11 performs an all-information input and registration process that causes the user of the target terminal apparatus to enter the product information and workflow information at a time. The CPU 11 then proceeds to step 132. In the all-information input and registration process, operations in steps 108 through 112 to register the product information and operations in steps 116 through 128 to register the workflow information are consecutively performed. The all-information input and registration process is not described any longer. In the second mode, after the product information and workflow information are received, the order information is displayed on the order production screen and the work production screen.

In step 132, the CPU 11 determines whether a predetermined end timing has arrived. If the yes path is followed in step 132, the CPU 11 returns to step 100. If the no path is followed in step 132, the information processing process ends. According to the exemplary embodiment, the end timing is when an instruction to end the information processing process is entered by the user. The disclosure is not limited to this method.

According to the exemplary embodiment, the information processing process is performed by the server 10. The disclosure is not limited to this method. For example, the information processing process may be performed by the terminal apparatus 50 or by both the server 10 and the terminal apparatus 50.

According to the exemplary embodiment, the variety of databases are registered on the server 10. The disclosure is not limited to this method. For example, the variety of databases may be registered on any terminal apparatus 50 or on an apparatus that excludes the terminal apparatus 50 and is accessible by the server 10.

According to the exemplary embodiment, the user having the work operation role is disabled to edit the product information. The disclosure is not limited to this method. For example, if the product information is edited by the user having the work operation role, information indicating that the product information is edited by the user having the work operation role may be notified to the user having the sales operation role who has entered the product information. The manner of notifying the user having the sales operation role may be performed in the form of notifying the terminal apparatus 50 used by the user or another terminal apparatus, such as a smart phone.

The exemplary embodiment has been described. The scope of the disclosure is not limited to the exemplary embodiment. A variety of modifications and improvements are possible to the exemplary embodiment without departing from the spirit of the disclosure and modified or improved embodiments fall into the scope of the disclosure.

The exemplary embodiment is not intended to limit the claims and a combination of all features described in the discussion of the exemplary embodiment may not necessarily be required to achieve the disclosure. The exemplary embodiment includes a variety of phases of the disclosure and a combination of multiple elements disclosed form a variety of the disclosure. A subset of the elements disclosed in the exemplary embodiment may be deleted and the exemplary embodiment with the subset deleted may still form the disclosure as long as the benefit thereof is still effective.

According to the exemplary embodiment, the information processing process is implemented by a software configuration, namely, by a computer that executes a software program. The disclosure is not limited to this method. For example, the information processing process may be implemented by a hardware configuration or a combination of the hardware configuration and software configuration.

The configuration of the server 10 has been described for exemplary purposes only. A portion may be added to or deleted from the configuration without departing from the scope of the disclosure.

The structures of the variety of screens described above have been described for exemplary purposes only. A portion may be added to or deleted from the screens without departing from the scope of the disclosure.

The flow of the information processing process described above has also been described for exemplary purposes only. A step may added to or deleted from the information processing process without departing from the scope of the disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

APPENDIX (((1)))

An information processing apparatus including:

a processor configured to:

receive, from a first user, product information that is input and related to a finished product produced in accordance with a workflow and excludes workflow information that is related to the workflow;

present, to a second user, information indicated by the received product information; and receive from the second user the workflow information responsive to production of the finished product.

(((2)))

In the information processing apparatus according to (((1))), the finished product is printed matter.

(((3)))

In the information processing apparatus according to (((2))), the product information includes at least one of a format, a finished size, a type of paper sheet, or a number of copies of the printed matter; and the workflow information includes at least one piece of information related to pre-press of the printed matter, information related to an output of printing press, information related to printing, or information related to processing.

(((4)))

In the information processing apparatus according to one of (((1))) through (((3))), the processor is configured to receive the product information and the workflow information from a different terminal apparatus.

(((5)))

In the information processing apparatus according to (((4))), the first user has a sales operation role to sell the finished product, and the second user has a work operation role to perform work to produce the finished product.

(((6)))

In the information processing apparatus according to (((5))), the processor is configured to disable the product information from being edited by the user having the work operation role.

(((7)))

In the information processing apparatus according to (((6))), the processor is configured to, if the user having the work operation role edits the product information, notify the user having the sales operation role having entered the product information that the user having the work operation role edits the product information.

(((8)))

In the information processing apparatus according to one of (((1))) through (((7))), the processor is configured to receive from a user an indication of selection between a first mode and a second mode, wherein in the first mode, the product information is received from the first user;

information indicated by the received product information is presented to the second user; and the workflow information is received from the second user; and wherein in the second mode, the product information and the workflow information are received from the user.

(((9)))

In the information processing apparatus according to (((8))), the processor is configured to display, regardless of results of the selection by the user, order information that indicates a target for which the product information has been received.

(((10)))

In the information processing apparatus according to (((9))), the processor is configured to:

after the product information is received from the first user and before the workflow information is received from the second user, display in the first mode the order information including the product information on an order information list screen; and after the product information and the workflow information are received, display in the second mode the order information on the order information list screen.

What is claimed is:

1. An information processing apparatus comprising:

a processor configured to:

receive, from a first user, product information that is input and related to a finished product produced in accordance with a workflow and excludes workflow information that is related to the workflow;

present, to a second user, information indicated by the received product information; and receive from the second user the workflow information responsive to production of the finished product, wherein the processor is configured to receive from a user an indication of selection between a first mode and a second mode, wherein in the first mode, the product information is received from the first user;

information indicated by the received product information is presented to the second user; and the workflow information is received from the second user; and wherein in the second mode, the product information and the workflow information are received from the user.

2. The information processing apparatus according to claim 1, wherein the finished product is printed matter.

3. The information processing apparatus according to claim 2, wherein the product information includes at least one of a format, a finished size, a type of paper sheet, or a number of copies of the printed matter; and wherein the workflow information includes at least one piece of information related to pre-press of the printed matter, information related to an output of printing press, information related to printing, or information related to processing.

4. The information processing apparatus according to claim 1, wherein the processor is configured to receive the product information and the workflow information from a different terminal apparatus.

5. The information processing apparatus according to claim 4, wherein the first user has a sales operation role to sell the finished product, and the second user has a work operation role to perform work to produce the finished product.

6. The information processing apparatus according to claim 5, wherein the processor is configured to disable the product information from being edited by the second user having the work operation role.

7. The information processing apparatus according to claim 6, wherein the processor is configured to, if the second user having the work operation role edits the product information, notify the first user having the sales operation role having entered the product information that the second user having the work operation role edits the product information.

8. The information processing apparatus according to claim 1, wherein the processor is configured to display, regardless of results of the selection by the user, order information that indicates a target for which the product information has been received.

9. The information processing apparatus according to claim 8, wherein the processor is configured to:

after the product information is received from the first user and before the workflow information is received from the second user, display in the first mode the order information including the product information on an order information list screen; and after the product information and the workflow information are received, display in the second mode the order information on the order information list screen.

10. A non-transitory computer readable medium storing a program causing a computer to execute a process for processing information, the process comprising:

receiving, from a first user, product information that is input and related to a finished product produced in accordance with a workflow and excludes workflow information that is related to the workflow;

presenting, to a second user, information indicated by the received product information; and receiving from the second user the workflow information responsive to production of the finished product, wherein the process further comprises receiving from a user an indication of selection between a first mode and a second mode, wherein in the first mode, the product information is received from the first user;

information indicated by the received product information is presented to the second user; and the workflow information is received from the second user; and wherein in the second mode, the product information and the workflow information are received from the user.

11. An information processing apparatus comprising:

means for receiving, from a first user, product information that is input and related to a finished product produced in accordance with a workflow and excludes workflow information that is related to the workflow;

means for presenting, to a second user, information indicated by the received product information; and means for receiving from the second user the workflow information responsive to production of the finished product, wherein the apparatus further comprises means for receiving from a user an indication of selection between a first mode and a second mode, wherein in the first mode, the product information is received from the first user;

information indicated by the received product information is presented to the second user; and the workflow information is received from the second user; and wherein in the second mode, the product information and the workflow information are received from the user.

* * * * *